(12) United States Patent
Bezancon et al.

(10) Patent No.: US 9,378,507 B2
(45) Date of Patent: Jun. 28, 2016

(54) SYSTEM AND METHOD OF DISSEMINATING ELECTRONIC CONTENT UTILIZING GEOGRAPHIC AND TIME GRANULARITIES

(75) Inventors: Anne Bezancon, Oakland, CA (US); Daniel Parkes, San Francisco, CA (US)

(73) Assignee: 1020, Inc., San Francisco, CA (US)

( * ) Notice: Subject to any disclaimer, the term of this patent is extended or adjusted under 35 U.S.C. 154(b) by 913 days.

(21) Appl. No.: 12/816,368

(22) Filed: Jun. 15, 2010

(65) Prior Publication Data

US 2011/0010422 A1 Jan. 13, 2011

Related U.S. Application Data

(60) Provisional application No. 61/187,898, filed on Jun. 17, 2009.

(51) Int. Cl.
*G06F 15/16* (2006.01)
*G06Q 30/02* (2012.01)
*H04L 29/08* (2006.01)

(52) U.S. Cl.
CPC ............... *G06Q 30/02* (2013.01); *H04L 67/10* (2013.01); *H04L 67/306* (2013.01)

(58) Field of Classification Search
CPC ....................................................... H04L 67/10
USPC ....................................................... 709/204
See application file for complete search history.

(56) References Cited

U.S. PATENT DOCUMENTS

| | | | |
|---|---|---|---|
| 5,740,549 A | 4/1998 | Reilly et al. | |
| 5,761,601 A | 6/1998 | Nemirofsky et al. | |
| 5,835,061 A | 11/1998 | Stewart | |
| 5,915,243 A | 6/1999 | Smolen | |
| 5,937,392 A | 8/1999 | Alberts | |
| 5,948,040 A | 9/1999 | DeLorme et al. | |
| 5,948,061 A | 9/1999 | Merriman et al. | |
| 5,969,678 A | 10/1999 | Stewart | |
| 6,044,403 A | 3/2000 | Gerszberg et al. | |
| 6,108,709 A | 8/2000 | Shinomura et al. | |
| 6,119,098 A | 9/2000 | Guyot et al. | |
| 6,259,405 B1 | 7/2001 | Stewart et al. | |
| 6,326,918 B1 | 12/2001 | Stewart | |
| 6,430,500 B1 | 8/2002 | Kubota et al. | |
| 6,452,498 B2 | 9/2002 | Stewart | |
| 6,456,234 B1 | 9/2002 | Johnson | |

(Continued)

OTHER PUBLICATIONS

International Search Report and Written Opinion, dated Aug. 17, 2010 which issued in corresponding PCT application PCT/US2010/038873, 12 pgs.

(Continued)

*Primary Examiner* — Hua Fan
(74) *Attorney, Agent, or Firm* — DLA Piper LLP (US)

(57) ABSTRACT

A system and method for disseminating electronic content by defining a plurality of places each having a location and at least one place attribute associated therewith, receiving electronic content from a network, identifying a target geographic extent for the electronic content, identifying a target time extent for the electronic content, identifying at least one of the plurality of places based upon its location being within the target geographic extent, identifying an electronic device located at or proximate to the identified at least one place while within the target time extent, and distributing the electronic content to the identified electronic device over a network.

16 Claims, 6 Drawing Sheets

(56) References Cited

U.S. PATENT DOCUMENTS

| | | |
|---|---|---|
| 6,487,538 B1 | 11/2002 | Gupta et al. |
| 6,553,310 B1 | 4/2003 | Lopke |
| 6,601,046 B1 | 7/2003 | Epstein |
| 6,697,018 B2 | 2/2004 | Stewart |
| 6,698,020 B1 | 2/2004 | Zigmond et al. |
| 6,714,791 B2 * | 3/2004 | Friedman .................. 455/456.1 |
| 6,759,960 B2 | 7/2004 | Stewart |
| 6,795,700 B2 | 9/2004 | Karaoguz et al. |
| 6,798,358 B2 | 9/2004 | Joyce et al. |
| 6,799,032 B2 | 9/2004 | McDonnell et al. |
| 6,804,657 B1 | 10/2004 | Sultan |
| 6,819,267 B1 | 11/2004 | Edmark et al. |
| 6,832,373 B2 | 12/2004 | O'Neill |
| 6,845,400 B2 | 1/2005 | Mapherson et al. |
| 6,848,542 B2 | 2/2005 | Gailey et al. |
| 6,920,464 B2 | 7/2005 | Fox |
| 6,983,313 B1 | 1/2006 | Korkea-aho |
| 6,990,462 B1 | 1/2006 | Wilcox et al. |
| 7,009,556 B2 | 3/2006 | Stewart |
| 7,039,599 B2 | 5/2006 | Merriman et al. |
| 7,058,594 B2 | 6/2006 | Stewart |
| 7,062,510 B1 | 6/2006 | Eldering |
| 7,150,030 B1 | 12/2006 | Eldering et al. |
| 7,234,942 B2 | 6/2007 | Hu et al. |
| 7,239,871 B2 | 7/2007 | Shamp et al. |
| 7,366,779 B1 | 4/2008 | Crawford |
| 7,366,799 B2 | 4/2008 | Reddy et al. |
| 7,466,986 B2 | 12/2008 | Halcrow et al. |
| 7,487,112 B2 * | 2/2009 | Barnes, Jr. .................. 705/26.8 |
| 7,532,898 B2 | 5/2009 | Halcrow et al. |
| 7,571,249 B2 | 8/2009 | Wu |
| 7,589,628 B1 | 9/2009 | Brady, Jr. |
| 7,640,009 B2 | 12/2009 | Belkin et al. |
| 7,657,597 B2 * | 2/2010 | Arora et al. .................. 709/206 |
| 7,668,832 B2 | 2/2010 | Yeh et al. |
| 7,680,796 B2 | 3/2010 | Yeh et al. |
| 7,685,224 B2 * | 3/2010 | Nye .................. 709/201 |
| 7,801,956 B1 * | 9/2010 | Cumberbatch et al. ....... 709/204 |
| 7,917,153 B2 | 3/2011 | Orwant et al. |
| 7,970,827 B1 * | 6/2011 | Cumberbatch et al. ....... 709/204 |
| 8,214,738 B2 * | 7/2012 | Othmer et al. .................. 715/714 |
| 8,219,925 B2 * | 7/2012 | Othmer et al. .................. 715/774 |
| 8,308,567 B2 * | 11/2012 | Blackburn et al. .............. 463/42 |
| 8,359,397 B2 * | 1/2013 | Traversat et al. ............. 709/230 |
| 8,539,371 B2 * | 9/2013 | Othmer et al. .................. 715/774 |
| 2001/0029465 A1 | 10/2001 | Strisower |
| 2002/0036122 A1 | 3/2002 | Fayette et al. |
| 2002/0046232 A1 | 4/2002 | Adams et al. |
| 2003/0006911 A1 | 1/2003 | Smith et al. |
| 2003/0045996 A1 | 3/2003 | Yamazaki et al. |
| 2003/0056218 A1 | 3/2003 | Wingard et al. |
| 2003/0061206 A1 | 3/2003 | Qian |
| 2003/0110171 A1 * | 6/2003 | Ozer et al. ...................... 707/10 |
| 2003/0135581 A1 | 7/2003 | Phalen et al. |
| 2003/0177058 A1 | 9/2003 | Needham |
| 2004/0181807 A1 | 9/2004 | Theiste et al. |
| 2004/0203890 A1 | 10/2004 | Karaoguz et al. |
| 2004/0209602 A1 | 10/2004 | Joyce et al. |
| 2004/0259567 A1 | 12/2004 | Valko et al. |
| 2005/0038698 A1 | 2/2005 | Lukose et al. |
| 2005/0055374 A1 | 3/2005 | Sato |
| 2005/0086261 A1 | 4/2005 | Mammone |
| 2005/0096978 A1 | 5/2005 | Black |
| 2005/0143094 A1 | 6/2005 | Reed et al. |
| 2005/0222905 A1 | 10/2005 | Wills |
| 2006/0064346 A1 | 3/2006 | Steenstra et al. |
| 2006/0173841 A1 | 8/2006 | Bill |
| 2006/0248177 A1 | 11/2006 | Dostert et al. |
| 2006/0282316 A1 | 12/2006 | Snyder et al. |
| 2006/0293955 A1 | 12/2006 | Wilson et al. |
| 2007/0015516 A1 | 1/2007 | Huotari et al. |
| 2007/0030824 A1 | 2/2007 | Ribaudo et al. |
| 2007/0050244 A1 | 3/2007 | Stevens |
| 2007/0088801 A1 | 4/2007 | Levkovitz et al. |
| 2007/0198674 A1 | 8/2007 | Li et al. |
| 2007/0260531 A1 | 11/2007 | Bezancon |
| 2007/0260741 A1 | 11/2007 | Bezancon |
| 2007/0273558 A1 | 11/2007 | Smith et al. |
| 2008/0275759 A1 | 11/2008 | Parkes et al. |
| 2008/0294584 A1 | 11/2008 | Herz |
| 2008/0312817 A1 | 12/2008 | Kawauchi |
| 2009/0044246 A1 * | 2/2009 | Sheehan et al. ................ 725/146 |
| 2009/0059874 A1 | 3/2009 | Carter |
| 2009/0063293 A1 | 3/2009 | Mirrashidi et al. |
| 2009/0125396 A1 * | 5/2009 | Otto et al. ........................ 705/14 |
| 2009/0150489 A1 * | 6/2009 | Davis et al. .................... 709/204 |
| 2009/0156182 A1 | 6/2009 | Jenkins et al. |
| 2009/0177745 A1 * | 7/2009 | Davis et al. .................... 709/204 |
| 2009/0187623 A1 * | 7/2009 | Narayanaswami et al. ... 709/204 |
| 2009/0192873 A1 * | 7/2009 | Marble .......................... 705/10 |
| 2009/0204560 A1 | 8/2009 | Kim |
| 2009/0276803 A1 * | 11/2009 | Weaver ....................... 725/32 |
| 2009/0299857 A1 | 12/2009 | Brubaker |
| 2010/0070758 A1 * | 3/2010 | Low et al. ..................... 713/155 |
| 2010/0138491 A1 * | 6/2010 | Churchill et al. ............. 709/204 |
| 2010/0191589 A1 * | 7/2010 | Matte .......................... 705/14.16 |
| 2010/0228593 A1 * | 9/2010 | Belwadi et al. ................. 705/10 |
| 2010/0250673 A1 * | 9/2010 | Laroia et al. .................. 709/204 |
| 2010/0280904 A1 * | 11/2010 | Ahuja ........................ 705/14.58 |
| 2010/0325207 A1 * | 12/2010 | Churchill et al. ............. 709/204 |
| 2011/0010422 A1 * | 1/2011 | Bezancon et al. ............. 709/204 |
| 2011/0041153 A1 * | 2/2011 | Simon et al. ..................... 725/46 |
| 2011/0191417 A1 * | 8/2011 | Rathod ........................ 709/204 |
| 2011/0196926 A1 * | 8/2011 | Crawford ..................... 709/204 |
| 2012/0239479 A1 * | 9/2012 | Amaro et al. ................ 705/14.23 |
| 2012/0302357 A1 * | 11/2012 | Simon et al. ..................... 463/42 |
| 2012/0303439 A1 * | 11/2012 | Flitcroft et al. ............. 705/14.36 |
| 2012/0316962 A1 * | 12/2012 | Rathod ........................ 705/14.54 |
| 2013/0013689 A1 * | 1/2013 | Crawford ..................... 709/204 |

OTHER PUBLICATIONS

U.S. Appl. No. 10/886,502, filed Jul. 2004, Bezancon.
U.S. Appl. No. 13/339,582, filed Dec. 2008, Parkes et al.
U.S. Appl. No. 12/339,603, filed Dec. 2008, Parkes et al.
U.S. Appl. No. 12/367,477, filed Feb. 2009, Parkes et al.

* cited by examiner

SYSTEM AND METHOD OF DISSEMINATING ELECTRONIC CONTENT UTILIZING GEOGRAPHIC AND TIME GRANULARITIES

RELATED APPLICATIONS

This application claims the benefit of U.S. Provisional Application No. 61/187,898, filed Jun. 17, 2009, and which is incorporated herein by reference.

FIELD OF THE INVENTION

The present invention relates to information databases and networks, and more particularly to a system and method for distributing electronic content based upon the location.

BACKGROUND OF THE INVENTION

With the advent of the Internet, wireless networks, and portable electronic devices, there has been an explosion of location-based information that can be disseminated based upon the location of the recipient. Specifically, it is known to automatically detect the proximity of an electronic device such as a cell phone, smartphone or PDA to a particular location, and select electronic content for transmission to that electronic device that has a particular relevancy to that location. For example, a user that is detected to be presently within one mile of a car dealership would be a prime target for an advertising campaign for that dealership, or for the type of cars sold at that dealership. An advertiser could transmit advertising electronic content to that person's portable electronic device once the proximity to the dealership is detected.

The effectiveness of location based advertising is greatly enhanced by inferring more than just a simple location/proximity relationship between the user and the goods/services being advertised. If the advertiser can deduce the demographics of people likely present at a given location, then a more sophisticated advertising strategy can be utilized (i.e. one that maximizes the effectiveness of advertising by better matching content to a demographic of people that is more likely to purchase the advertised goods or services). For example, if a user is detected at an arena during a wedding accessories convention, or during a children's play, or during a technology trade show, then a demographic of young women, or of parents, or of high-tech professionals respectively can be inferred for those people carrying electronic devices at that location during those events. Advertising specifically targeted to those demographics (but separate and apart from the event that brought that demographic together) could be transmitted during these events. In that case, trendy clothes ads could be sent to those at the wedding accessories convention, or toy advertisements could be sent to those attending the children's play, or ads for electronic gadgets could be sent to those attending the trade show. The associations between these events and the ads would be indirect (i.e. the ads are not directly related to the events, but rather they are related to something about the event that drives who attends it and why certain advertising would be generally more effective for this group of attendees).

Unfortunately, the demographics of people present at any given location at any given time are usually complex and driven by multiple factors. Even with larger events such as a concert or sporting event, there can be many factors that determine the demographic mix of people present at any given location at any given time. Thus, transmitting content based merely on location often times is insufficient to maximize advertising effectiveness.

There is a need for a system and methodology of tracking various factors that dictate why people may be present at any given location and time, and for identifying which electronic content would be suitable for sending to those people depending upon the various advertising campaigns to choose from.

BRIEF SUMMARY OF THE INVENTION

The aforementioned problems and needs are addressed by identifying and classifying factors that characterize dynamically changing aspects of locations and time that indicate why people may be present at any given location and time, examining the relationship between the factors and the locations/times, developing correlations between them to determine the likely demographics of people present at that time, and matching appropriate content for distribution to those people.

A method of disseminating electronic content comprises defining a plurality of places each having a location and at least one place attribute associated therewith, receiving electronic content from a network, identifying a target geographic extent for the electronic content, identifying a target time extent for the electronic content, identifying at least one of the plurality of places based upon its location being within the target geographic extent, identifying an electronic device located at or proximate to the identified at least one place while within the target time extent and distributing the electronic content to the identified electronic device over a network.

A system for disseminating electronic content comprises a storage module in which a plurality of places are defined each having a location and at least one place attribute associated therewith, a network connection for receiving electronic content, an association module configured to identify a target geographic extent for the electronic content and identify a target time extent for the electronic content and identify at least one of the plurality of places based upon its location being within the target geographic extent, and a location detection module configured to identify an electronic device located at or proximate to the identified at least one place while within the target time extent, wherein at least one of the association module and the location detection module is configured to distribute the electronic content to the identified electronic device via a network.

Other objects and features of the present invention will become apparent by a review of the specification, claims and appended figures.

DETAILED DESCRIPTION OF THE INVENTION

The present invention is a system and method for disseminating electronic content that takes into account the granularity of geography and time (i.e. the variable extent in geography and time) in determining how various locations should be defined and how electronic content should be disseminated.

Figure 1:
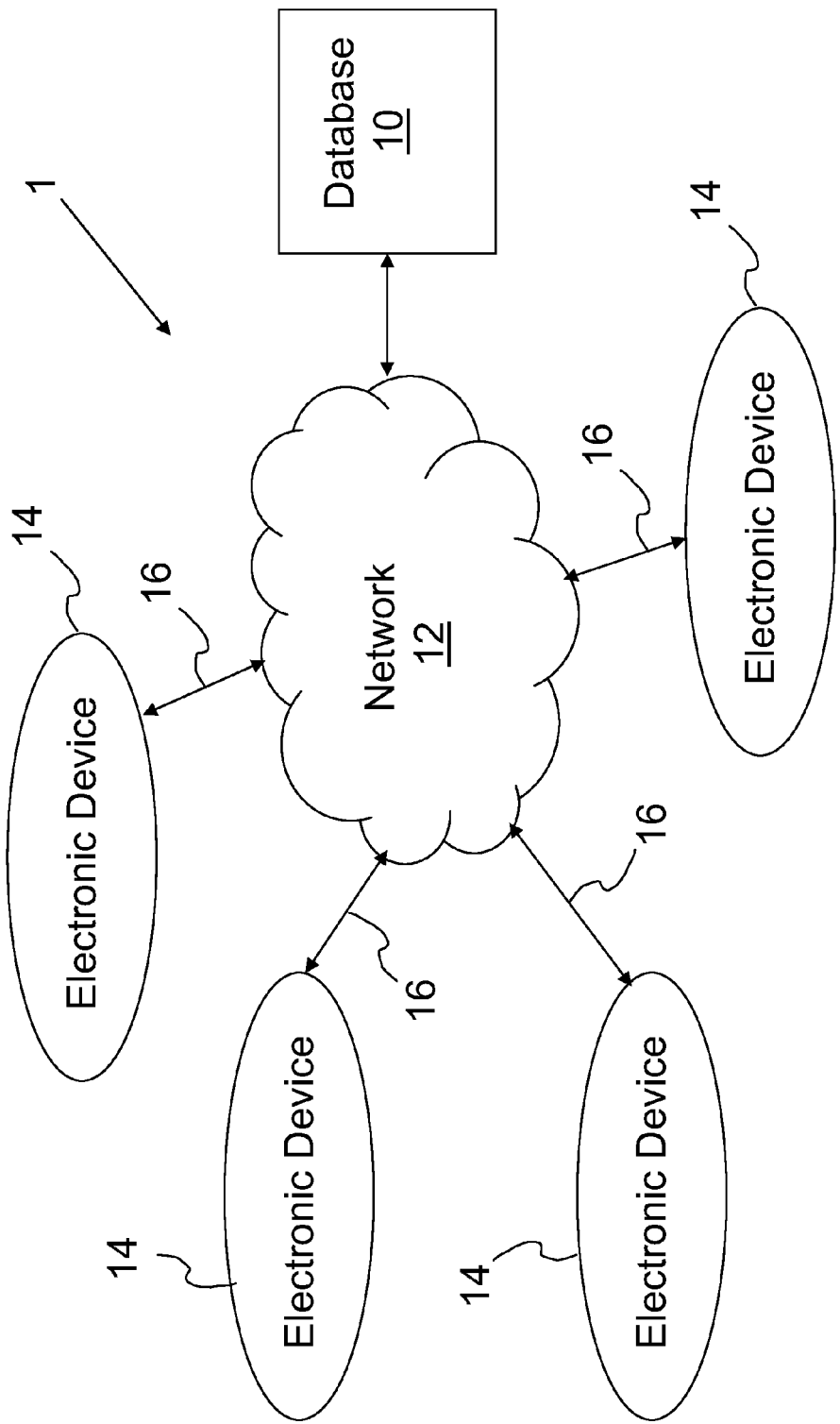
FIG. 1 is a diagram illustrating the electronic content distribution system of the present invention.

FIG. 1 illustrates the electronic content distribution system 1. A database 10 is connected to a network 12. A plurality of electronic devices 14 (e.g. cell phones, portable and desktop computers, PDA's, MP3 players, gaming devices, etc.) are also connectable to network 12 via wired or wireless connections 16. The network 12 can be one or more point to point connections, a single network (e.g. the Internet), nested networks and/or multiple interconnected or separate networks. Network 12 can be wired and/or wireless. The electronic devices 14 and/or the network 12 are configured to convey information about the locations of the electronic devices 14 to database 10. In response, database 10 identifies appropriate electronic content based upon the identified locations, and either sends or has sent that electronic content to the electronic devices 14 via network 12. One example of electronic content selected based upon location is location-specific advertising, which is most effective when delivered to a user via their electronic device 14 when present at a location that is relevant to the advertised goods or services.

Figure 2:
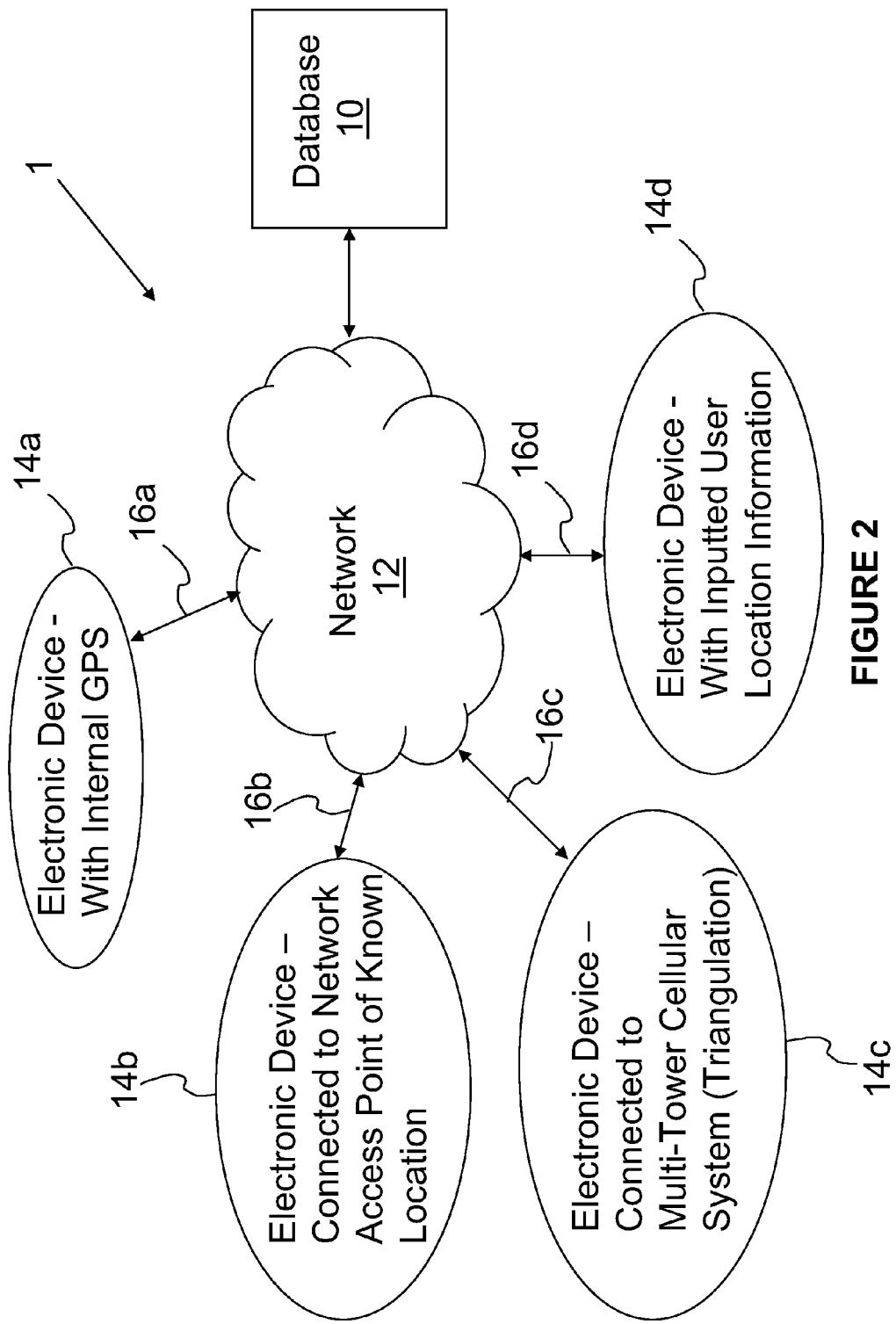
FIG. 2 is a diagram illustrating specific examples of electronic devices used as part of the electronic content distribution system of the present invention.

There are several techniques for automatically determining the location of any given electronic device 14. For example, as illustrated in FIG. 2, electronic device 14a includes an internal GPS system, which determines the location of electronic device 14a from a network of GPS satellites. The determined location of electronic device 14a is communicated to the database 10 via connection 16a and network 12. Electronic device 14b is connected to the network 12 via connection 16b, which utilizes a network access point having a known location (e.g. a WiFi hotspot inside a business of known location). When the electronic device 14b connects to the network 12 via connection 16b that utilizes the network access point of known location, that location is then communicated to database 10 via network 12. Electronic device 14c is connected to the network 12 via a connection 16c that is part of a cellular communications system having a plurality of cell towers. The cell tower system (and/or an external network communicating with the cell tower system) can determine approximate location of the electronic device 14c actively (by triggering interactions with cell tower(s) of known locations—e.g. triangulation) or passively (by retrieving information about recent tower interactions), and send that location to database 10 via network 12. Electronic device 14d includes an input device (i.e. keyboard, touchscreen, etc.) that allows the user to input location information, which is then communicated to database 10 via connection 16d and network 12.

An important feature of system 1 is determining what information about the identified location should be used to determine which electronic content is most relevant to the identified location, or more importantly most relevant to the likely demographics of people present at the location at that time. Demographics relate to traits that form the identity of people. These traits include inherent traits (hobbies, gender, age, etc.), transitory traits (hungry, busy, traveling, etc.), relative traits (traits existing only because of the place and/or event they are attending), and cyclical traits (meals, sleep, season, holidays, etc.). These traits can be static or dynamic not only to the individual, but to locations in which people live and congregate.

One example of dynamic demographics includes people present at a delicatessen (deli) located off the lobby of an office building during lunch on a weekday, who are going to have different demographics from those of people present at the same deli on a Saturday just before a baseball game at an adjacent arena. Moreover, those demographics could be further affected by a free music concert at an adjacent park, or an exhibit opening at a nearby museum. In fact, the demographics of the same individual can vary based on time of day (e.g. early morning before breakfast versus early afternoon after lunch). In order to better identify which electronic content is most appropriate to send to users of electronic devices based on their location, the system 1 employs a strategic methodology in determining how electronic content should be best disseminated to maximize its intended effect by considering geographic granularity and time granularity. This methodology does not necessarily mean collecting or developing more information about location, time and demographics, but rather better use of location, time and demographic data to make intelligent decisions in selecting content for distribution (and for determining what information is effective for this purpose and therefore should be collected and/or developed in the first place).

The concept of geographic and time granularity is related to the term "place" which is distinguishable from location and can vary over time. Location identifies a point, a 2-dimensional polygonal or elliptical area on the earth's surface, or even a 3-dimensional volume over the earth's surface. Location is typically expressed as a syntactic expression. Examples of syntactic location expressions include street address, building name, neighborhood, district, park, city, county, state, province, country, or any other regional designation. Location can alternately and/or additionally be expressed by longitude/latitude coordinates that define the point, area or volume.

In contrast, "place" separately defines the qualities, characteristics, features, aspects, uses, residents or tenants, etc. of the location using place attributes. It is these place attributes that help define the demographics of people associated with that location at any given time. Place attributes can include names, biographical information, contact information, business information (including business listing, brand of business, category of business, business hours, product inventory or availability, product pricing, products traditionally sold at the business, special deals or offerings, etc.), current events at or near the location, surrounding locations and places, neighborhood information, historical information, nearby points of interest, specific demographic information about residents or visitors at or near the location (e.g. census or marketing data or research, psychographics, behavior targeting data, statistical data, etc.), purchasing pattern information, lifestyle information, and any other information related to activities or uses at or near the location and/or the people likely present at the location. For locations having multiple tenants or uses, different defined places can exist at the same location, each having a unique set of place attributes that differentiate that place from other places at the same location or at other locations. Therefore, place attributes can also include information such as floor, suite, unit, apartment number, etc. to help identify relative position of the multiple tenants/uses (places) within the same location. Some place attributes are static (e.g. business name, type of business, hours of operation, etc.), while others are dynamic (e.g. local events). Lastly, a place can be a collection of smaller places (i.e. sub-places). For example, an office building is a place that includes all of its tenants (each of which can be its own place), a neighborhood is a place that is also a collection of all the individual places within the neighborhood, and so on. Thus, there can be a hierarchy of places and sub-places, where any place can be a sub-place of a geographically larger place (e.g. a tenant place can be a sub-place of an office building place, which can be a sub-place of an office park place, which can be a sub-place of a city place, and so on).

Figure 3:
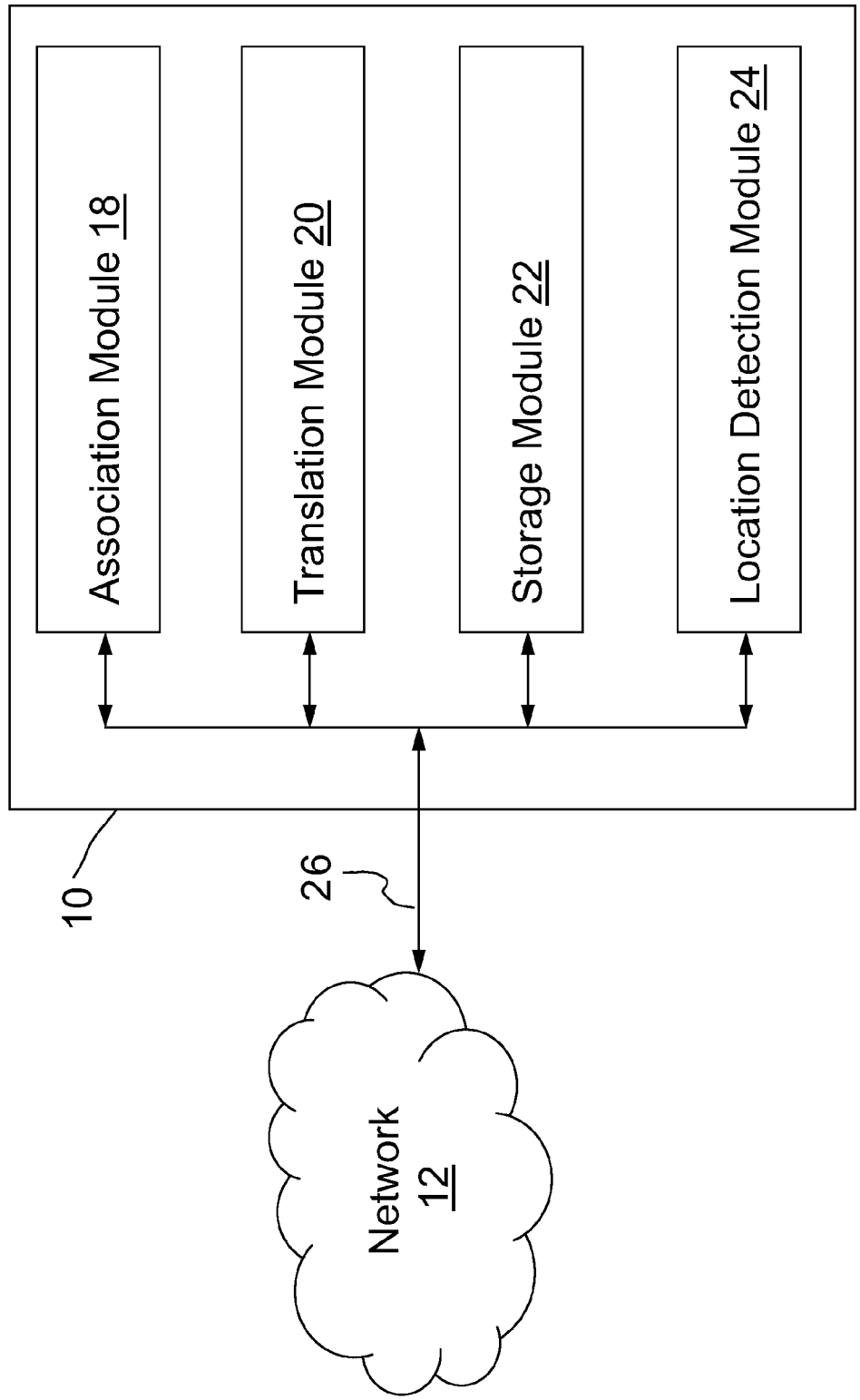
FIG. 3 is a diagram illustrating components of the database used as part of the electronic content distribution system of the present invention.

FIG. 3 illustrates the components of the database 10 that manages the data for locations/places. Database 10 includes an association module 18, a translation module 20, a storage module 22, a location detection module 24 and a wired or wireless connection 26 to the network 12. Storage module 20 can be any storage device for storing information, including one or more volatile and/or non-volatile memory and storage devices physically located together or separately. When place/time attribute information is received, the association module 18 determines which locations and/or places it is relevant to, and then associates the information with those locations/places. The place/time attribute information could be location information about one or more specific locations, and/or place attribute information about the one or more specific locations. The associations are then stored in storage module 22. For instance, using the deli example above, the received place/time attribute information could relate to the business hours for the deli, in which case the information would be stored as a new (or modified) place attribute for the "place" that corresponds to the deli. Or, the received place/time attribute information could relate to parking information for the office building, in which case the information is stored as a new place attribute for each of the places defined in that building (i.e. the deli, the other businesses off the building lobby, the tenants on the floors above the lobby, etc.). When all the place attributes for the deli are retrieved from storage module 22, they will include the business hours information (specific to just the deli place) and the parking information (specific to all places within the office building and the office building itself). When place attributes for any one of the other lobby businesses or building tenants are retrieved from storage module 22, they will include the parking information along with any other place attributes for that place.

Some of the received place/time attribute information may include alias codes that certain users utilize to identify a location or a place. For example, a User A could be a vendor that tags place/time attribute information with its own alias code to identify a specific address location, while a User B could be a different vendor that tags place/time attribute information with its own different alias code to identify the same specific address location. When alias codes are used, translation module 20 translates the alias code to the appropriate locations and/or places, so that the corresponding information can be associated with those locations and/or places by the association module 18.

Location detection module 24 receives the location information for the electronic devices 14 connected to network 12. As discussed above, this information can originate from the electronic device 14 itself, its connection 16 to the network 14, the network 14, or even declared automatically or manually by actions of the user. The location detection module 24 then uses the location information to determine at which location(s)/place(s) each electronic device should be considered present and/or should be considered not present. Depending on the location/place, presence (or the lack thereof) is found if the electronic device meets (or fails to meet) a certain proximity threshold relative to the location/place at issue. If the proximity threshold is zero, then the electronic device would have to be located at the location/place to be considered present. An electronic device could be deemed present at multiple locations/places at once. For example, an electronic device determined to be located inside the deli discussed above would also be considered present in the office building, etc. Content distribution can be contingent on presence at a location or place, non-presence at a location or place, or both.

Figure 4:
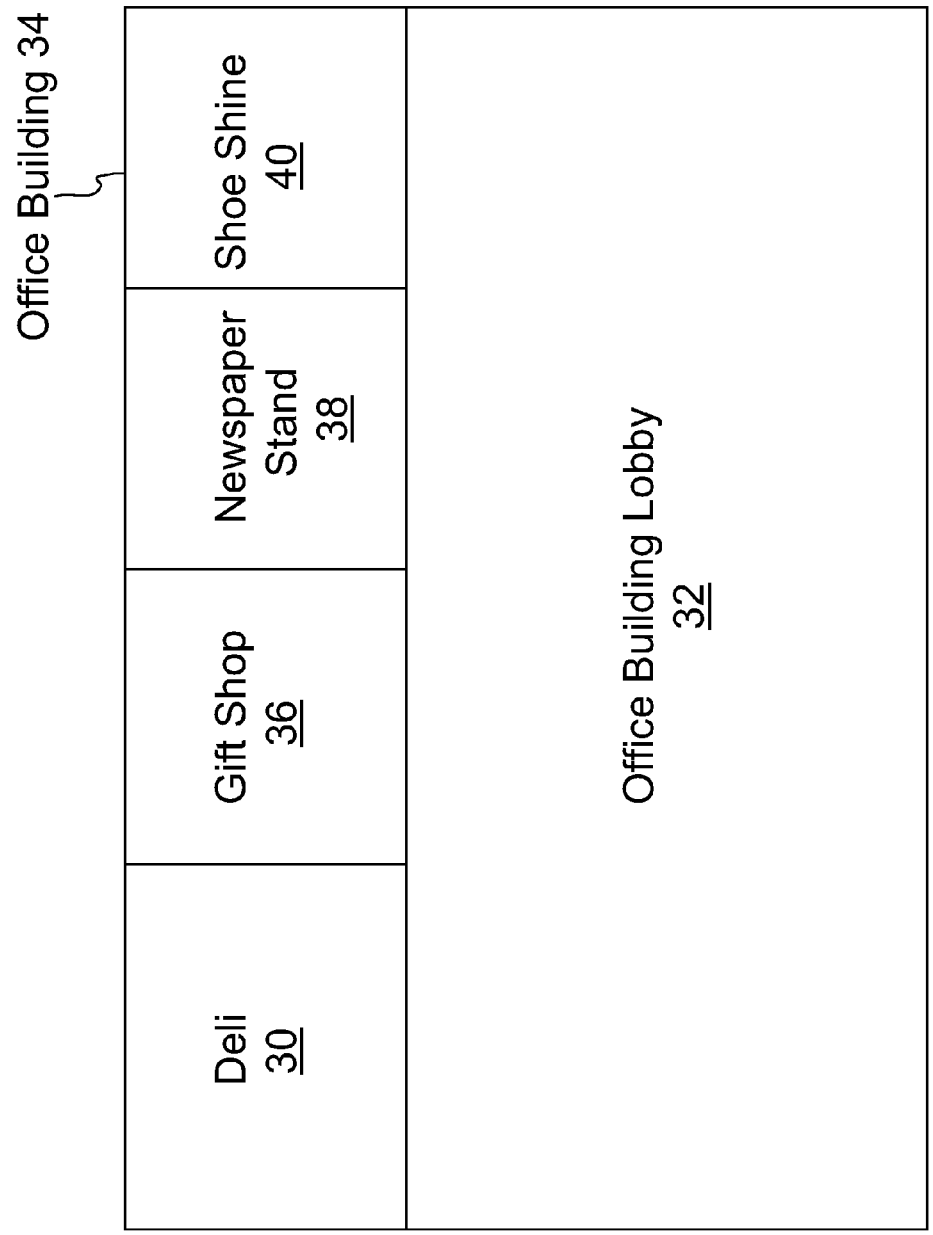
FIG. 4 is a top diagram view illustrating exemplary places that can be found in an office building ground floor.
Figure 5:
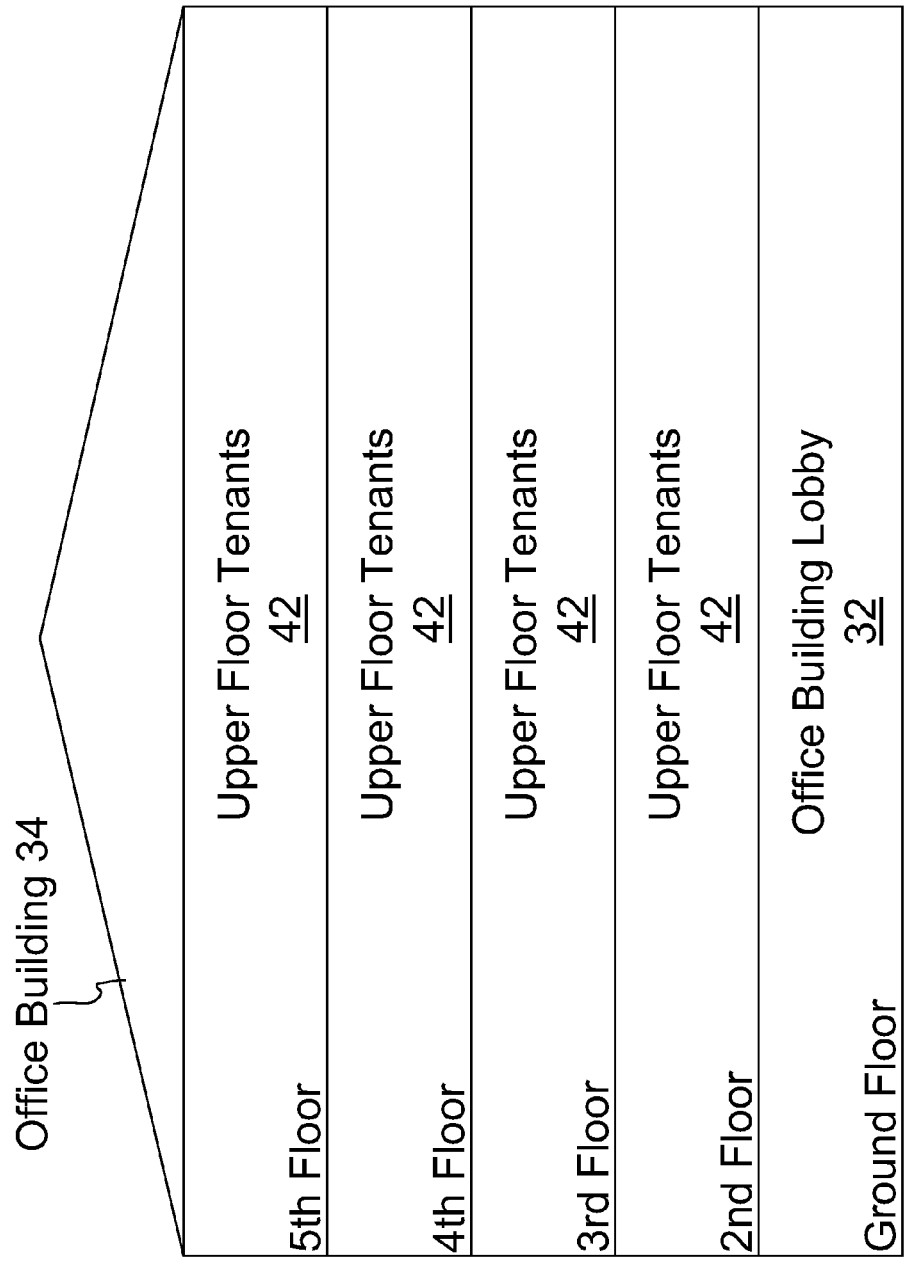
FIG. 5 is a side diagram view illustrating exemplary places that can be found on various floors of an office building.
Figure 6:
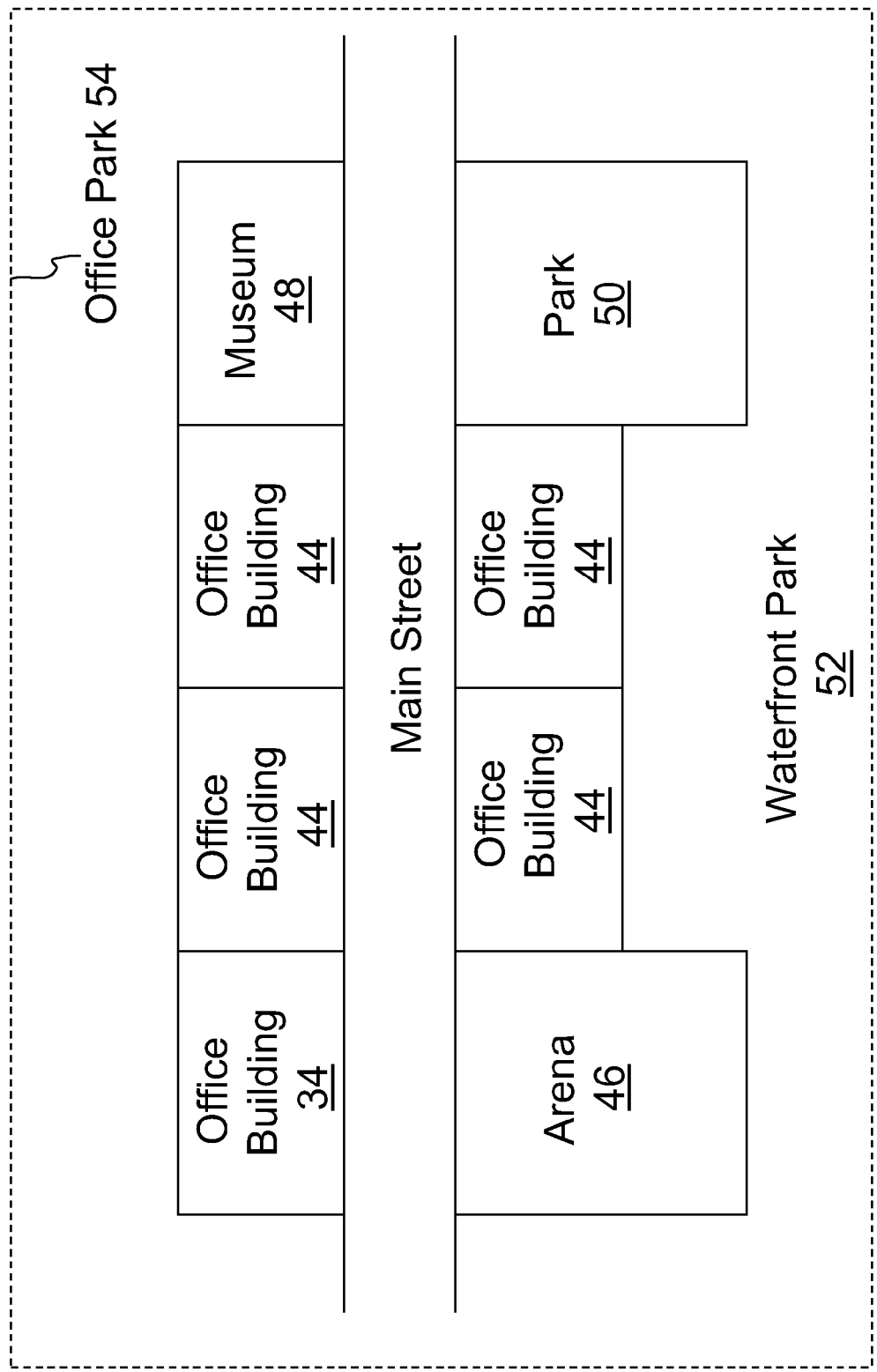
FIG. 6 is a top diagram view illustrating exemplary places that can be found in an office park.

Geographic and time granularity become important for attributes of one place that are applicable to another place. Any given location/place has a geographic granularity (i.e. that geographic area over which it is considered to extend—as used herein its geographic extent) and a time granularity (i.e. open ended and/or closed ended time period(s) over which it is considered to extend—as used herein its time extent) associated with it that should be considered when determining how to 1) define the location/place, and 2) distribute electronic content to electronic devices present at the location/place. For instance, the example of the deli 30 located off the lobby 32 of the office building 34 in the office park 36 discussed above is illustrated in FIGS. 4-6. The highest geographic granularity (i.e. the lowest geographic extent) will be the deli 30 itself. However, a lower geographic granularity (i.e. higher geographic extent) will include all the other businesses located off the lobby of the office building (e.g. gift shop 36, newspaper stand 38 and shoe shine 40). A still lower geographic granularity will include the upper floor tenants 42 of the office building 34. Still lower geographic granularities will include nearby office buildings 44, an arena 46 across the street, a museum 48 and a park 50 down the street, a waterfront park 52 a block away, the office park 54 containing these places, as well as other merchants on the same street, night clubs and restaurants in the area, the city itself, etc. Varying the geographic granularity with respect to the deli 30 will determine which attributes of adjacent or nearby places will 1) affect the place attributes associated with the deli 30, and 2) be considered in selecting electronic content to be distributed to electronic devices located at the deli 30.

There is also a time granularity associated with the place attributes for each of the places identified in the above example. For example, with respect to just the deli 30, the highest time granularity (i.e. lowest time extent) will be a specific time of day, say, 8 am in the morning, where the place attributes at that time could include among others a daily commuter special that offers discounted coffee with breakfast food to go. A lower time granularity (i.e. a higher time extent) could include the entire day, where the place attributes could then further include a lunch special and a late afternoon jazz band. Other lower time granularities could include the entire work week (where the place attributes could further include all the food specials, three afternoon bands of varying genre, and a weekly evening book club event), the entire week including the weekend (where the place attributes could further include alcoholic drink specials), the entire month (where the place attributes further include three NBA pre-game events for regular season games occurring in the adjacent arena 46, and a children's lunch event before a circus show also in the arena 46), etc. Varying the time granularity with respect to the place attributes for the deli 30 will determine which attributes are used to define the deli and which attributes of the deli will be considered in selecting electronic content to be distributed to electronic devices located at or near the deli.

Geographic granularity is a factor that the association module 18 uses in assigning attributes to various places. The primary consideration for geographic granularity is spatial proximity. An event at the arena 46 not only affects the place attributes for the place that is the arena 46, but for all places sufficiently proximate to the arena 46 to assume that event attendees are also likely present. Places beyond that proximity would not be associated with the event. So, for example, information about an event at the arena 46 could be considered a place attribute for all places within a certain distance of the arena 46 or within a larger (regional) place such as the office park 54 that includes the arena 46.

Time granularity is also a factor that the association module 18 uses in assigning attributes to various places. The primary consideration for time granularity is temporal proximity. A 3 hour event at the arena 46 not only affects the place attributes for the arena 46 during that three hours, but also affects the attributes of other places near the arena for the same 3 hour event window and for times near that window. The temporary change in the attributes of places near the arena reflect the likelihood that the demographics of people at and near the event will temporarily change because of the event attendees. After the expiration of the time extent of an attribute, it is then de-associated from those place(s) it was previously associated with.

The association module 18 can additionally base its association decisions on existing place attributes to selectively include or exclude places from the associations. Specifically, the association module 18 may decide to not associate a nearby event for a given place (even though that place is within the designated geographic/time proximity affected by the event) if that place already has attributes associated with it that make it unlikely to be affected by the event. For example, the association module 18 may decide to not associate a weekend concert event with an office building that is closed over the weekend (i.e. based on the existing business hours place attribute), given it would be unlikely that concert attendees would be inside the building on a weekend. As another example, the association module 18 may decide to associate the event with different places for different times based on existing place attributes. In the case of an evening rock concert at the arena 46, the event associated with the arena 46 for its three hour duration may instead be associated with the nearby deli 30 before the concert (for concert attendees eating before entering the concert) and with nearby night clubs after the concert is over (for concert attendees patronizing nearby night clubs after leaving the concert). These decisions are based on the existing place attributes of the deli (as an eatery) and the night clubs (as night spot destinations).

The association module 18 not only uses geographic and time granularity to decide which place attributes get associated with which places, but also to select which electronic content gets sent to which places. Any given electronic content (e.g. a dinner special advertisement for a restaurant) can have a target geographic granularity (e.g. a target geographic extent of a 4 mile radius of the restaurant) and/or a target time granularity (e.g. a target time extent from late morning to early evening) for distributing the electronic content. Once those target parameters are supplied to database 10, association module 18 and location detection module 24 determine which electronic devices 14 connected to network 12 should receive the electronic content. This is done by identifying which electronic devices 14 are present within the target geographic granularity, and meet the target time granularity. The database 10 either transmits or arranges to have transmitted the electronic content to those identified electronic devices 14. The electronic content can be stored locally on storage module 22, or database 10 can retrieve the electronic content which is stored elsewhere, or database 10 can command another computing device elsewhere to send the electronic content to the identified electronic devices 14.

The association module 18 can use multiple target geographic granularities associated with the same electronic content and the same place. For example, when an electronic device meets a first target geographic granularity (i.e. 1 mile proximity) to a place of business (e.g. car dealership), the data base 10 either transmits or arranges to have transmitted an advertisement for the car dealership to the electronic device. Then, when the electronic device meets a second target geographic granularity (i.e. 0 mile proximity—which confirms presence at the car dealership), the data base 10 either transmits or arranges to have transmitted a second advertisement (e.g. a thank you for visiting the car dealership) to the electronic device. The system can even track the effectiveness of the electronic content sent by the system (e.g. how many times are electronic devices detected as being present at a place or location that is the subject of advertisement electronic content after receiving the advertisement electronic content for that place or location). The system could also track such effectiveness over various time granularities (e.g. how long after receiving the advertisement did the electronic device arrive at the advertised place/location: within an hour, two hours, one day, two days, a week, etc.).

The association module 18 can also base its selection of places for receiving electronic content on target attributes in addition to the target geographic and time granularities. Specifically, the electronic content can have target attributes associated with it that can be used to include or exclude places that otherwise meet the target geographic and time granularities. For example, places meeting the target geographic and time granularities (e.g. 2 miles around the advertised restaurant during the afternoon and evening) must also have place attribute(s) that match that of the target attribute(s) of the electronic content (e.g. only places that also serve food or drinks) in order to receive the electronic content. As another example, electronic content advertising one business could be sent only to those electronic devices present at or proximate to one of its competitors.

The following is an example of how different combinations of target geographic granularities, time granularities and/or other target attributes can be used to select which electronic devices receive a particular electronic content. A car dealership on the same street as the deli 30 and arena 46 discussed above can target all electronic devices within 3 miles of the dealership (geographic granularity limitation), located in public businesses such as restaurants and shops (target attribute limitation) with electronic content advertising its cars. Time granularity can be used to select different versions of the electronic content so as to feature different cars to different electronic devices in the same geographic region (e.g. commuter cars advertised during breakfast and lunch times to target commuters, luxury sedans advertised during the evenings to target the nightlife crowd, SUV's advertised on the weekends to target the leisure crowd, etc.). In addition, multiple geographic granularities can be applied simultaneously. For example, sports cars could instead be featured for any places within three miles of both the car dealership and the arena 46 just before, during, and just after a rock concert at the arena 46 (to target youthful attendees of the event).

The database 10 preferably organizes the stored place information in a manner that reflects their granular and overlapping nature. Any given place can be a discrete place (i.e. no other place is found within the discrete place) or a regional place (i.e. one or more other places are found within that place). A regional place can include one or more regional places and/or discrete places. For example, the regional place that is the office building 34 contains many discrete places (the deli 30, the lobby 32, the other lobby businesses 36/38/40, and the upper floor tenants 42). Therefore, to streamline the organization of data stored in database 10, each place is defined by the attributes for just that place (if any), as well as the attributes of any places within that place. For example, the place that is the office building 34 includes any attributes that are associated with just the office building 34, as well as any attributes associated with any of the places within the office building 34. This methodology streamlines data storage and association. To illustrate, consider that a new place attribute (e.g. new telephone number) for deli 30 is added to the database 10. This new place attribute would be stored as an attribute associated to just the deli 30 (i.e. need only be stored once, and associated once). There is no need to associate and/or store this attribute for any of the regional places that include the deli 30 (e.g. the office building 34, the office park 54, etc.) because these regional places automatically include the attributes of the places within them. Therefore, the attributes of any regional place would preferably be those stored and associated with that regional place, plus data links to those attributes of places within the regional place. There is no need for multiple storage copies of the same attribute that applies to overlapping places, let alone the associated management of processing changes to that attribute throughout the system.

It is to be understood that the present invention is not limited to the embodiment(s) described above and illustrated herein, but encompasses any and all variations falling within the scope of the appended claims. For example, references to the present invention herein are not intended to limit the scope of any claim or claim term, but instead merely make reference to one or more features that may eventually be covered by one or more of the claims. Further, as is apparent from the above disclosure, not all method steps need be performed in the exact order illustrated or claimed, but rather can be in any order that allows for the receipt, the association, storage, and/or dissemination of place/time attribute information and content. The functionality of database 10 could be split up among plural computing devices connected to network 12.

The present invention can be embodied in the form of methods and apparatus for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

What is claimed is:

1. A method of disseminating electronic content, comprising:
    defining a plurality of places and a plurality of sub-places, wherein
        each of the plurality of places having a location, and
        each of the plurality of sub-places having a location at or in one of the locations of the plurality of places;
    for each of the plurality of sub-places, associating, by an association module of a data base, a plurality of non-geographic place attributes with the sub-place;
    storing the associations with the plurality of sub-places in the storage module;
    for each one of the plurality of places, associating with the one place, by the association module, at least one non-geographic place attribute and all the pluralities of non-geographic place attributes associated with the sub-places having their locations at or in the location of the one place;
    storing the associations with the plurality of places in the storage module;
    receiving electronic content from a network by the data base;
    identifying a target geographic extent for the electronic content by the association module;
    identifying a target time extent for the electronic content by the association module;
    identifying non-geographic target attribute information for the electronic content by the association module;
    identifying, by the association module, at least one of the plurality of places or plurality of sub-places based upon its location being within the target geographic extent and its at least one non-geographic place attribute or plurality of non-geographic place attributes associated therewith as stored in the storage module matching the non-geographic target attribute information;
    identifying, by a location module of the data base, an electronic device located at or proximate to the identified at least one place or sub-place while within the target time extent; and
    distributing, by the data base, the electronic content to the identified electronic device over a network;
    wherein:
        each of the non-geographic place attributes by itself does not uniquely identify a geographic location, and the non-geographic target attribute information by itself does not uniquely identify a geographic location.

2. The method of claim 1, further comprising:
    receiving non-geographic attribute information from a network;
    wherein the associating with the sub-places and the associating with the places comprises:
        determining which of the places and sub-places for which the non-geographic attribute information is relevant; and
        associating the non-geographic attribute information with any of the places and sub-places for which the attribute information is determined relevant;
    wherein the non-geographic attribute information by itself does not uniquely identify a geographic location.

3. The method of claim 2, wherein the determining of which of the places and sub-places for which the non-geographic attribute information is relevant comprises:
    identifying a geographic extent for the non-geographic attribute information; and
    identifying which of the places and sub-places have locations associated therewith which are within the geographic extent for the non-geographic attribute information.

4. The method of claim 2, further comprising:
    identifying a time extent for the non-geographic attribute information;
    wherein the associating comprises associating the non-geographic attribute information with any of the places and sub-places for which the non-geographic attribute information is determined relevant for a time period corresponding to the time extent.

5. The method of claim 2, further comprising:
    for each of the places and sub-places for which the non-geographic attribute information is determined relevant, identifying a time extent for the non-geographic attribute information, wherein the time extent for at least two of the places or sub-places varies from each other in at least one of a start time and a length of time;

wherein the associating with the sub-places and the associating with the places comprises associating the non-geographic attribute information with each of the places and sub-places for which the non-geographic attribute information is determined relevant for a time period corresponding to the time extent identified for that place or sub-place.

6. The method of claim 5, wherein the identifying of the time extents for the non-geographic attribute information for the places and sub-places is based on non-geographic attribute information already associated with the places and sub-places.

7. The method of claim 2, wherein the determining of which of the places and sub-places for which the non-geographic attribute information is relevant is based on non-geographic attribute information already associated with the places and sub-places.

8. The method of claim 2, wherein the determining of which of the places and sub-places for which the non-geographic attribute information is relevant comprises selectively excluding at least one of the places or sub-places having a location associated therewith within the target geographic extent based on non-geographic attribute information already associated with the at least one place or sub-place.

9. A system for disseminating electronic content, comprising:
a storage module in which a plurality of places and a plurality of sub-places are defined, wherein:
each of the plurality of places having a location,
each of the plurality of sub-places having a location at or in one of the locations of the plurality of places;
an association module configured to:
for each of the plurality of sub-places, associating a plurality of non-geographic place attributes with the sub-place, and providing the associations with the plurality of sub-places to the storage module for storage therein;
for each one of the plurality of places, associating with the one place at least one non-geographic place attribute and all the pluralities of non-geographic place attributes associated with the sub-places having their locations at or in the location of the one place, and providing the associations with the plurality of places to the storage module for storage therein;
a network connection for receiving electronic content;
an association module configured to:
identify a target geographic extent for the electronic content;
identify a target time extent for the electronic content;
identifying non-geographic target attribute information for the electronic content;
identify at least one of the plurality of places or plurality of sub-places based upon its location being within the target geographic extent and its at least one non-geographic place attribute or plurality of non-geographic place attributes associated therewith as stored in the storage module matching the non-geographic target attribute information; and
a location detection module configured to identify an electronic device located at or proximate to the identified at least one place or sub-place while within the target time extent;

wherein at least one of the association module and the location detection module is configured to distribute the electronic content to the identified electronic device via a network;

wherein:
each of the non-geographic place attributes by itself does not uniquely identify a geographic location, and the non-geographic target attribute information by itself does not uniquely identify a geographic location.

10. The system of claim 9, wherein the association module is configured to:
define the plurality of places and the plurality of sub-places by receiving non-geographic attribute information from a network;
associate the non-geographic attribute information with the places and sub-places by:
determining which of the places and sub-places for which the non-geographic attribute information is relevant; and
associating the non-geographic attribute information with any of the places and sub-places for which the non-geographic attribute information is determined relevant;
wherein the non-geographic attribute information by itself does not uniquely identify a geographic location.

11. The system of claim 10, wherein the association module is configured to determine which of the places and sub-places for which the non-geographic attribute information is relevant by:
identifying a geographic extent for the non-geographic attribute information; and
identifying which of the places and sub-places have locations associated therewith which are within the geographic extent for the non-geographic attribute information.

12. The system of claim 10, wherein the association module is further configured to identify a time extent for the non-geographic attribute information, and to perform the associating of the non-geographic attribute information by associating the non-geographic attribute information with any of the places and sub-places for which the non-geographic attribute information is determined relevant for a time period corresponding to the time extent.

13. The system of claim 10, wherein the association module is further configured to identify a time extent for the non-geographic attribute information for each of the places and sub-places for which the non-geographic attribute information is determined relevant, wherein the time extent for at least two of the places or sub-places varies from each other in at least one of a start time and a length of time, and to perform the associating with the sub-places and the associating with the places of the non-geographic attribute information by associating the non-geographic attribute information with each of the places and sub-places for which the non-geographic attribute information is determined relevant for a time period corresponding to the time extent identified for that place or sub-place.

14. The system of claim 13, wherein the association module is further configured to identify the time extents for the non-geographic attribute information for the places and sub-places based on non-geographic attribute information already associated with the places and sub-places.

15. The system of claim 10, wherein the association module is further configured to determine which of the places and sub-places for which the non-geographic attribute information is relevant based on non-geographic attribute information already associated with the places and sub-places.

16. The system of claim 10, wherein the association module is further configured to determine which of the places and sub-places for which the non-geographic attribute information is relevant by selectively excluding at least one of the places or sub-places having a location associated therewith within the target geographic extent based on non-geographic attribute information already associated with the at least one place or sub-place.

* * * * *